Nov. 24, 1970  R. O. ENGH  3,543,260
SELF CHECKING INTRUDER AND FIRE DETECTOR UNITS AND SYSTEM
Filed July 24, 1968  2 Sheets-Sheet 1
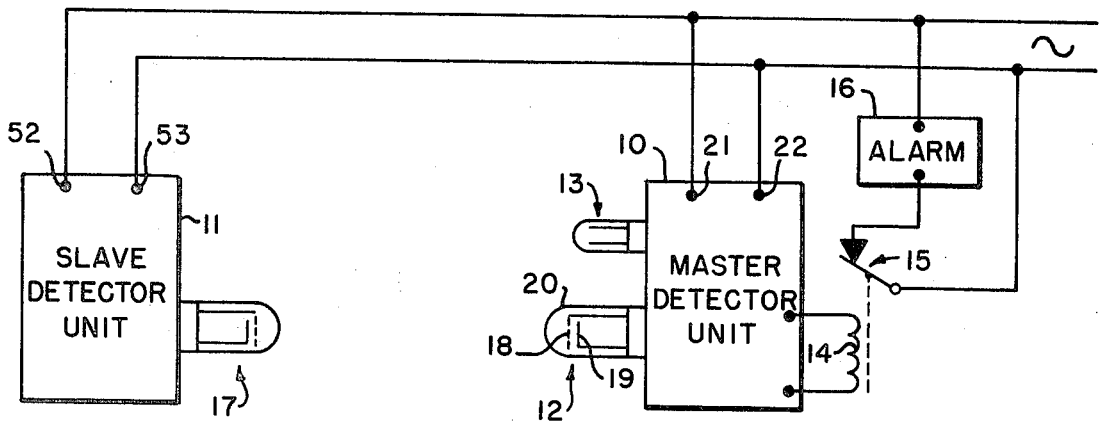
Fig. 1
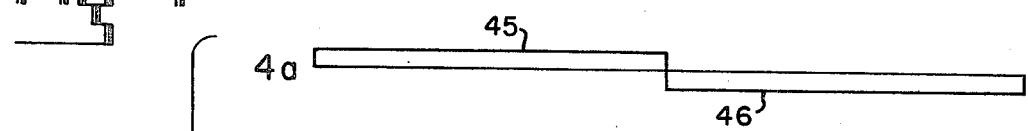
Fig. 4
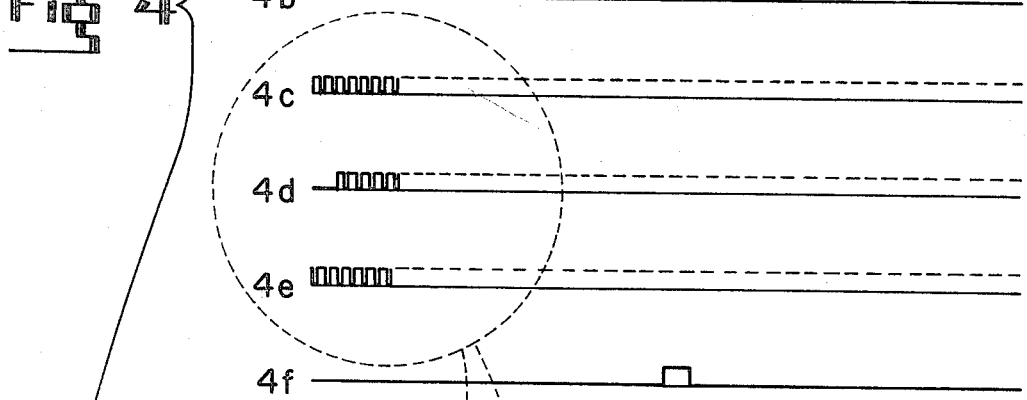
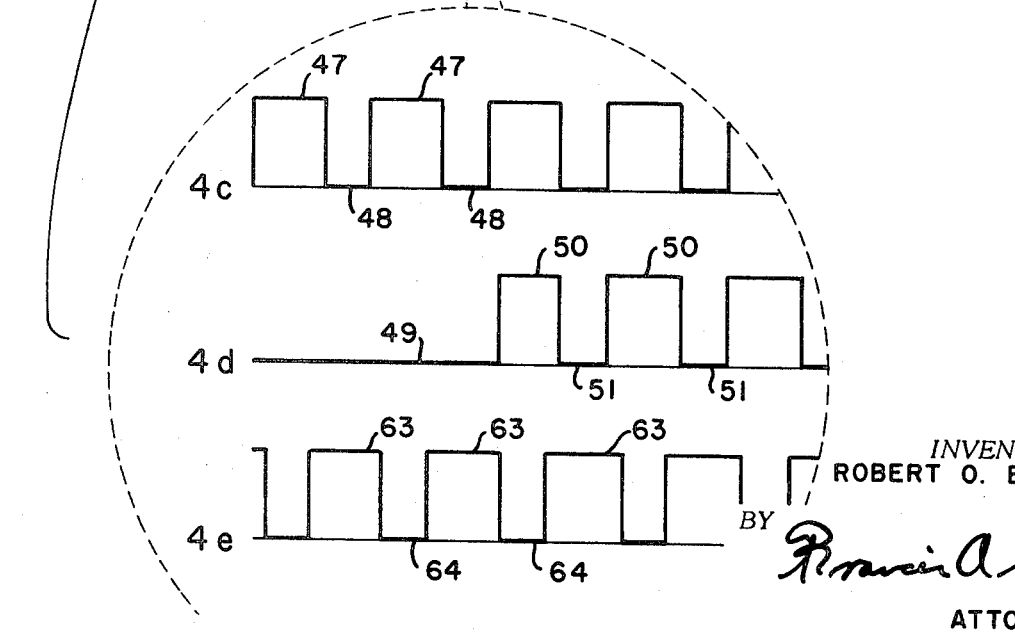
INVENTOR.
ROBERT O. ENGH
BY
ATTORNEY.

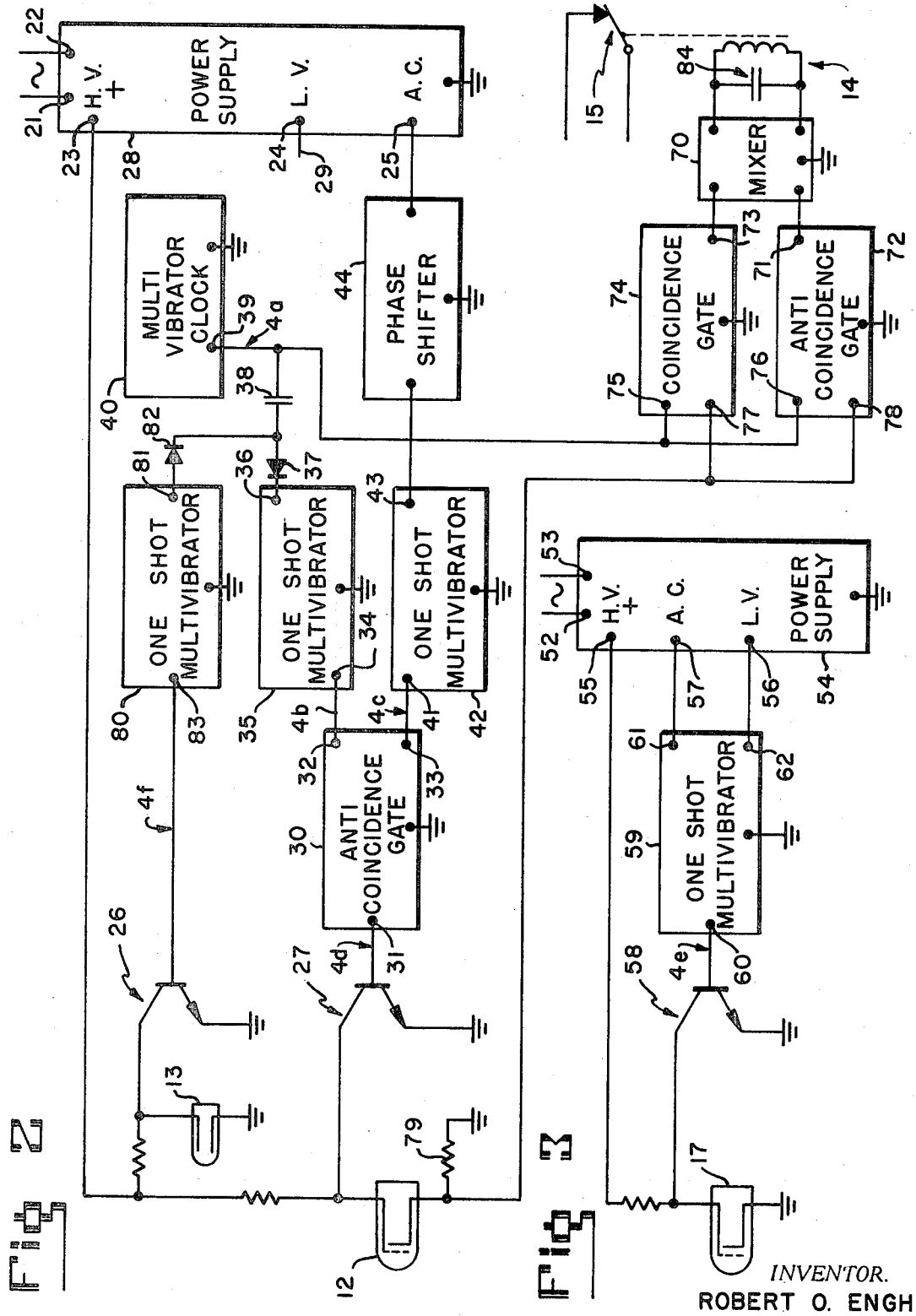

United States Patent Office 3,543,260
Patented Nov. 24, 1970

---

3,543,260
SELF CHECKING INTRUDER AND FIRE DETECTOR UNITS AND SYSTEM
Robert O. Engh, Hopkins, Minn., assignor to Honeywell Inc., Minneapolis, Minn., a corporation of Delaware
Filed July 24, 1968, Ser. No. 747,150
Int. Cl. H01j *39/00;* G08b *19/00, 13/18, 17/12*
U.S. Cl. 340—228                        9 Claims

ABSTRACT OF THE DISCLOSURE

A self checking intruder and fire detecting system utilizing two ultraviolet detectors which are rendered conductive in the presence of ultraviolet energy, and which also emit ultraviolet energy when conductive; a cyclic power supply for each detector, the power supplies being phased so that the detectors are cyclically operative in continuous overlapping fashion; with a free-running clock to periodically energize a source of ultraviolet energy at the beginning of an intruder detection mode of operation and to periodically remove the operating voltage from one of the said detectors to break the voltage overlap of continuous operation at the beginning of a fire detection mode of operation; and with an output responsive only to cyclic operation of one detector during the intruder detection mode and responsive only to the continuous absence of operation of the one detector during the fire detection mode.

BRIEF SUMMARY OF THE INVENTION

My invention makes use of a radiation detector which is sensitive to radiation found in fire, for example, ultraviolet. In this detector, current flows through a gaseous medium when this radiation is detected, and the detector also emits similar radiation as a result of this current flow.

I utilize two of these detectors, adapted to be placed at spaced positions, to supervise an area. The operating voltage supplied to each detector provides cyclic periods of activating voltage and deactivating voltage, the phasing of the cyclic voltage being such that the periods of activating voltage for one detector overlap with periods of activating voltage of the other detector.

A free-running clock cyclically establishes a first fire detecting mode and then a second intruder detecting mode. As will be apparent, the first mode is also a mode of self check for intruder detection and the second mode is also a mode of self check for fire detection.

The clock initiates the intruder detection mode by a short period of energization of a source of radiation. One of the detectors conducts in response to this radiation. The radiation of this one detector is passed to the other detector to cause this other detector to conduct at a time when its activating voltage is applied. In this manner, radiation is passed back and forth between the detectors. If the radiation is intercepted, as by an intruder, an alarm is energized.

After a period of intruder detection operation, the clock initiates the fire detection mode by interrupting the radiation. This is accomplished by a relatively long period of deactivating voltage for one of the detectors, thus interrupting the overlap in the periods of activating voltage of the two detectors. During the remaining portion of the fire detection mode, cyclic periods of activating voltage and deactivating voltage are applied to the one detector. If the detector during this period responds to radiation, as from a fire, an alarm is energized.

DESCRIPTION OF THE DRAWING

FIG. 1 is a showing of the special relationship of the two detector units, one designated a slave unit and the other designated a master unit;
FIG. 2 is a showing of the construction of the master unit;
FIG. 3 is a showing of the construction of the slave unit; and
FIG. 4 shows the output wave forms of various components within the slave unit and the master unit.

DESCRIPTION OF THE PREFERRED EMBODIMENT

Referring to FIG. 1, master detector unit 10 is spaced from slave detector unit 11, and the space between these two units is the area to be supervised. Master detector unit 10 includes a detector 12 and a source of radiation 13. The output of this detector unit consists of relay 14 having a normally closed switch 15 connected in series with an alarm 16. Slave detector unit 11 includes detector 17. The two detector units are connected to a common source of alternating current at terminals 21, 22 and 52, 53.

Detectors 12 and 17 are of the type shown in U.S. Pat. 3,344,302 which issued on Sept. 26, 1967, wherein I am a co-inventor with Robert G. Johnson. Each detector is a gas filled device having an anode 18 and a cathode 19, disposed within a radiation permeable envelope 20. The detectors have an operating voltage characteristic such that a voltage equal to or above an activating voltage must be applied to the detector in order for the detector to become conductive as a result of ultraviolet radiation. When the detector is subjected to this radiation, the detector fires and conducts electrical current from the anode to the cathode. The ionization of the gas causes the tube to emit ultraviolet radiation. Once the tube is rendered conductive, it remains conductive until the operating voltage applied to the electrodes drops to a level which is equal to or below a deactivating voltage.

FIG. 2 discloses the construction of master detector unit 10. This unit is connected to the common source of alternating current by terminals 21 and 22, these terminals energizing a power supply having a high voltage output terminal 23, a low voltage output terminal 24, and an alternating current signal output terminal 25. This alternating current signal is used as a timing signal.

High voltage terminal 23 is connected to supply operating voltage to the source of ultraviolet radiation 13 and to detector 12.

As will be apparent, source 13 and detector 12 have operating voltage applied thereto in accordance with the state of conduction of transistors 26 and 27 respectively.

The low voltage terminal of power supply 28 is connected to conductor 29 to supply operating voltage to the various circuit elements of the master detector unit.

Transistor 27 is controlled by the output of anti-coincidence gate 30, this gate having an output terminal 31 connected by conductor 4d to the base electrode of transistor 27, and having two input terminals 32 and 33. Input terminal 32 is connected by conductor 4b to output terminal 34 of a one shot multivibrator 35. Input terminal 36 of multivibrator 35 is connected through diode 37 and differentiating capacitor 38 to conductor 4a and output terminal 39 of a multivibrator clock 40.

The second input terminal 33 of anti-coincidence gate 30 is connected by conductor 4c to output terminal 41 of one shot multivibrator 42, this multivibrator having input terminal 43 connected through phase shifter 44 to alternating current terminal 25 of power supply 28.

The wave forms shown in FIG. 4, individually identified as 4a through 4f identify the output wave forms of various structural elements of FIGS. 2 and 3.

The output of clock 40 is as shown in wave form 4a and appears at conductor 4a of FIG. 2. Wave form 4a consists of a first portion 45 and a second portion 46, each portion having a selected time duration of, for example, from 100 to 500 milliseconds. The leading edge of the portion 45 represents a positive going voltage which is applied through capacitor 38 and diode 37 to trigger one shot multivibrator 35. Multivibrator 35, once triggered, provides an output pulse at terminal 34 and conductor 4b of FIG. 2 as shown in curve 4b. The output pulse has a time duration of approximately 33⅓ milliseconds, the time duration of two cycles of 60 hertz alternating current.

Input terminal 43 of multivibrator 42 is triggered by the alternating current of terminal 25, as shifted in phase by phase shifter 44. Alternating current source 21, 22 may, for example, be a 60 hertz source, and multivibrator 42 is sensitive to each cycle of this source to provide an output on conductor 4c of FIG. 2 as shown in wave form 4c. FIG. 4 also includes a portion of wave form 4c which is increased in proportion. Each cycle of this wave form includes a period 47 and a period 48. Each cycle 47, 48 equals the time period of one cycle of the 60 hertz alternating current, or 16⅔ milliseconds. The time duration of the portion 47 is greater than one-half the alternating current cycle and, for example, may be 10 milliseconds, thus making portion 48 6⅔ milliseconds.

Anti-coincidence gate 30 is responsive to wave forms 4b and 4c. The output of this gate, at terminal 31 and conductor 4d of FIG. 2, is shown in the wave form 4d of FIG. 4. Referring to FIG. 4, during the portion 49, which is 33⅓ milliseconds in duration, no output appears at conductor 4d of FIG. 2. Thereafter, the wave form 4c and the wave form 4d are identical and in phase.

Transistor 27 responds to wave form 4d such that this transistor is turned off during the portions 50 of the wave form and is turned on during the portions 51 of the wave form. With transistor 27 turned off, activating voltage is applied to detector 20. When transistor 27 is turned on, during the portions 51 of the wave form 4d, deactivating voltage is applied to detector 20.

Referring now to FIG. 3, this figure discloses the construction of the slave detector unit 11. Terminals 52 and 53 are adapted to be connected to the common source of alternating current to energize power supply 54 having high voltage output terminal 55, low voltage output terminal 56, and alternating current output terminal 57. Terminal 55 is connected to detector 17 and activating or deactivating voltage is applied to this detector under the control of transistor 58. Output terminal 60 of one shot multivibrator 59 is connected by conductor 4e to the base electrode of transistor 58. Input terminal 61 is connected to alterating current terminal 57. Low voltage for multivibrator 59 is applied to terminal 62.

Multivibrator 59 is similar in construction to multivibrator 42 of the master detector. However, multivibrator 59 is triggered by the common alternating current without phase shift. As a result, the output wave form of multivibrator 59, on conductor 4e of FIG. 3, is as shown in wave form 4e of FIG. 4. The portions 63 of this wave form correspond in time duration and function to the portions 47 of wave form 4c. Likewise, the portions 64 of the wave form 4e correspond to the portions 48 of the wave form 4c. However, by virtue of phase shifter 44 which has shifted the phase of wave form 4c, the portion 63 of wave form 4e is approximately centered on the portion 48 of the wave form 4c. Thus, there is an overlap in the portions 47 and 63 of the two wave forms. As will be apparent, this overlap in the portions 47 and 63 consist of an overlap in the periods of activating voltage being applied to detectors 12 and 17 of the master detector unit and the slave detector unit.

Transistor 58 of the slave detector unit is controlled by the output of multivibrator 59, this being wave form 4e, such that transistor 58 is nonconductive during the portions 63 of the wave form and is conductive during the portions 64 of the wave form. Nonconduction of transistor 58 is effective to cause activating voltage to be applied to detector 17. Conduction of transistor 58 is operative to cause deactivating voltage to be applied to detector 17.

The remaining portion of my invention will be described as the first and second modes of operation are described.

FIRST MODE OF OPERATION

The first mode of operation can be characterized as a fire detection mode of operation and this mode is one in which an output means requires that there be continuous nonconduction of detector 12 during the mode. This mode can also be characterized as the mode during which the intruder detection mode is self checked.

The fire detection mode is instituted by output portion 45 of clock 40, as shown in wave form 4a of FIG. 4. As has been described, the leading edge of the portion 45 of this wave form is effective to cause a relatively long period 49, equal to several cycles 50, 51, (see wave form 4d of FIG. 4) to be applied to detector 12. This insures that detector 12 does not emit ultraviolet radiation for a relatively long time period and thus detector 17 of the slave unit should become and remain nonconductive. Thereafter, during the remaining portion of the period 45 of FIG. 4a, cyclic activating and deactivating voltage (see portions 50 and 51 of wave form 4d, FIG. 4) is applied to detector 12. If a fire exists in the area of detector units 10 and 11, this ultraviolet energy is detected by either detector 12 or 17. Normally, however, such ultraviolet radiation is not present and the output means, relay 14, remains energized.

Referring to FIG. 2, relay 14 is energized by means of a mixer 70 which is connected to output terminal 71 of an anti-coincidence gate 72 and is also connected to output terminal 73 of a coincidence gate 74. Input terminals 75 and 76 of these gates are connected to conductor 4a, the output of clock 40. Input terminals 77 and 78 of these gates are connected to the output of detector 12 as developed across resistor 79. During the first mode of operation, anti-coincidence gate 72 is effective, so long as no output appears at terminal 78, to apply an output to terminal 71 to maintain relay 14 energized and switch 15 open. Capacitor 84 smooths the pulsating output of mixer 70 and improves reliability by insuring that relay 14 will not respond to single abnormal deenergizing events.

SECOND MODE OF OPERATION

The second mode of operation can be characterized as an intruder detection mode of operation and it is during this mode of operation that the above mentioned fire detection mode is self checked.

The second mode of operation is instituted by the portion 46 of the wave form 4a generated by clock 40. At the initial portion 46 of the wave form, which appears as a negative pulse, one shot multivibrator 80 is triggered. Input terminal 81 of this multivibrator is connected through diode 82 and capacitor 38 to conductor 4a of FIG. 2. Output terminal 83 of this multivibrator is connected to conductor 4f.

The wave form 4f of FIG. 4 shows the output of multivibrator 80 and this consists of an approximate 35 millisecond pulse, long enough to insure coincidence a 47 portion. This pulse controls transistor 26 and turns the transistor to an off condition. During this time period of 35 milliseconds, ultraviolet source 13 is energized. This ultraviolet energy is effective to cause one of the detectors 17 or 12 to fire. Once one of the detectors fires, ultraviolet radiation continuously passes back and forth between the two detectors such that a continuous cyclic output appears at resistor 79 of the master detector unit. During the intruder detection mode of operation, coincidence gate 74 is effective. So long as there is a coincidence in the occurrence of the cycle output of detector 12 and the output 4a of clock 40, relay 14 is maintained energized and switch 15 is maintained open.

The ultraviolet radiation may be interrupted by any means such as smoke, an intruder, or ultraviolet absorbing organic vapors to cause alarm 16 to be energized.

SELF CHECKING OPERATION

During the course of above mentioned fire detecting mode, detector 12 has cyclic activating and deactivating voltage applied to its electrodes and normally ultraviolet radiation is not present. However, one cannot be certain that the detector will in fact detect radiation when it does occur. During the intruder detecting mode, detector 12 cyclically responds to ultraviolet energy and therefore the ability of this detector to detect ultraviolet energy is checked.

Likewise, during the intruder detection mode, it is necessary that detector 12 be cyclically subjected to ultraviolet energy. The presence of an intruder breaks this ultraviolet energy. Normally, however, an intruder is not present and one cannot be certain that detector 12 is capable of detecting the absence of this radiation.

However, during the fire detecting mode, detector 12 must continuously indicate that no radiation is present, thus, during the fire detecting mode, the ability of detector 12 to detect the absence of radiation is checked.

Another self-checking feature resides in the ability of my invention to check for either a dead detector or a runaway detector. A dead detector is defined as a detector which will not conduct current when activating voltage is applied to its electrodes and when the detector is subjected to ultraviolet radiation. A runaway detector is a detector which will always conduct current when activating voltage is applied to the electrodes, even in the absence of ultraviolet energy.

In the case of a dead detector, either detector 17 or 12, detector 12 fails to cycle during the intruder detection mode and coincidence gate 74 is not operative. Thus, relay 14 is deenergized, switch 15 closes and alarm 16 is energized.

In the case of a runaway tube, detector 12 becomes cyclically conductive and then nonconductive during the fire detection mode and anti-coincidence gate 72 is effective to deenergize relay 14, causing switch 15 to close and alarm 16 to be energized.

Other unit components are checked as well, since any failure which renders the units unable to operate as above describes results in alarm energization.

The embodiments of the invention in which an exclusive property or right is claimed are defined as follows:

1. A master detector unit and a slave detector unit for use in combination with a common alternating current supply as a self checking intruder detecting and fire detecting system; said master detector unit comprising:
   voltage input terminals adapted to be connected to the common alternating current supply,
   free-running clock means having a first and a second mode of output,
   a radiation detector which is sensitive to a given radiation found in a fire, said radiation detector having an activating voltage characteristic and a deactivating voltage characteristic and being operable when exposed to said radiation to conduct current and to emit the same radiation as a result of the conduction,
   cyclic voltage supply means having an output voltage waveform connected to periodically activate said radiation detector, and having input means connected to said terminals and to said clock means; the output of said voltage supply means during said first mode of output of said clock means consisting of a first relatively long period of deactivating voltage and a second period of recurring activating voltage and relatively short deactivating voltage; and the output of said voltage supply means during said second mode of output of said clock means consisting of a third period of recurring activating voltage and deactivating voltage,
   and output means connected to said radiation detector and to said clock means, said output means being responsive to continuous nonconduction of said radiation detector during said first mode of output of said clock means, and being responsive to recurring conduction and nonconduction of said radiation detector during said second mode of output of said clock means;
   and said slave detector unit comprising:
      voltage input terminals adapted to be connected to the common alternating current supply;
      a radiation detector which is sensitive to a given electromagnetic radiation found in a fire, said radiation detector having an activating voltage characteristic and a deactivating voltage characteristic and being operable when exposed to said radiation to conduct current and to emit the same radiation as result of the conduction;
      cyclic voltage supply means having an output voltage waveform connected to periodically activate said radiation detector and having input means connected to said terminals; the output of said voltage supply means consisting of recurring activating voltage and deactivating voltage;
      said master detector unit and said slave unit being constructed and arranged such that the phasing of the cyclic voltage supply means of each of said units produces a continuous overlap of activating voltage for the detectors of each of said units during said second mode of output of said clock means.

2. A master detector unit and a slave detector unit as defined in claim 1 wherein the first and second modes of output of said clock means are fire detection and intruder detection modes respectively, and also self checking of intruder detection and self check of fire detection modes respectively.

3. A master detector unit and a slave detector unit as defined in claim 1 wherein said master detector unit includes:
   a source of said given radiation;
   and a second voltage supply means having an output connected to said source of radiation and having input means connected to said clock means; the output of said voltage supply means consisting of a relatively long period of energizing voltage at approximately the beginning of said second mode of output of said clock means.

4. A master detector unit and a slave detector unit as defined in claim 1 wherein the cyclic voltage supply means of said master detector unit comprises:
   a first one shot multivibrator having a relatively long time period output pulse, and having an input connected to said clock means to be responsive to said clock means at approximately the beginning of said first mode of output of said clock means,
   a second one shot multivibrator having an input connected to be responsive to each cycle of the common alternating current supply, and having an output pulse of shorter time duration than a cycle of the common alternating current supply,
   an anti-coincidence gate having an output connected to control the application of activating voltage to said radiation detector, and having an input connected to the outputs of said first and second one shot multivibrators,
   and wherein the cyclic voltage supply means of said slave detector unit comprises;
      a one shot multivibrator having an output connected to control the application of activating voltage to said radiation detector, having an input connected to be responsive to each cycle of the common alternating current supply and having an output pulse of shorter time duration than a cycle of the common alternating current supply.

5. A master detector unit and a slave detector unit as defined in claim 4 wherein one of said master detector unit one shot multivibrator and said slave detector unit one shot multivibrator includes phase shifting means.

6. A master detector unit and a slave detector unit as defined in claim 5 wherein said master detector unit anti-coincidence gate and said slave detector unit one shot multivibrator are constructued and arranged such that the output pulse of each is of greater time duration than ½ of a cycle of the common alternating current supply, said time duration constituting the time period of activating voltage for the radiation detector of each unit, and said phase shifting means producing said continuous overlap of activating voltage for the detector of each of said units during said second mode of output of said clock means.

7. A master detector unit and a slave detector unit as defined in claim 6 wherein said master detector unit includes:
a source of said given radiation, and third voltage supply means include a one shot multivibrator having a relatively long time period output pulse, having an output connected to said source of radiation, and having an input connected to said clock means to be responsive to said clock means at approximately the beginning of said second mode of output of said clock means.

8. A master detector unit and a slave detector unit as defined in claim 7 wherein said master detector unit output means includes:
an anti-coincidence gate connected to the detector of said master detector unit and to said clock means to respond to continuous nonconduction of said detection during said first mode of output of said clock means, and
a coincidence gate connected to the detector of said master detector unit and to said clock means to respond to recurring conduction and nonconduction of said detection during said second mode of output of said clock means.

9. In combination:
an area to be supervised for the presence of an intruder and fire,
first and second electrically operable detectors located at spaced points in said area, each of said detectors being sensitive to radiation found in fire, said detectors being rendered conductive upon the presence of said radiation and emitting said radiation as a result of said conduction, the spacing of said detectors being such that the radiation emitted by one detector impinges on the other detector,
first and second cyclic voltage supply means for each of said detectors, said voltage supply means being shifted in phase such that said detectors are continuously active in an overlapping fashion,
first means to periodically interrupt the supply voltage to one of said detectors to institute a combined fire detection mode and self check of intruder detection mode of operation,
second means to periodically supply said radiation to institute a combined intruder detection mode and self check of fire detection mode of operation,
and output means responsive only to nonconduction of one of said detectors during said fire detection mode and responsive only to cyclic conduction of said one detector during said intruder detection mode.

References Cited

UNITED STATES PATENTS

| 2,631,273 | 3/1953 | Bagno. | |
| 2,640,975 | 6/1953 | Roe et al. | |
| 3,372,279 | 3/1968 | Engh et al. | 250—83.6 |
| 3,387,135 | 6/1968 | Engh | 340—228 X |

ALVIN H. WARING, Primary Examiner

S. F. PARTRIDGE, Assistant Examiner

U.S. Cl. X.R.

250—83.3; 340—258, 411, 420